3,822,292
PREPARATION OF NAPHTHALIDE PSEUDO
ACID COMPOUNDS
Michael Feingold, Woburn, Mass., assignor to Polaroid
Corporation, Cambridge, Mass.
No Drawing. Filed Nov. 6, 1972, Ser. No. 304,248
Int. Cl. C07d 7/06
U.S. Cl. 260—343.2 R                       8 Claims

ABSTRACT OF THE DISCLOSURE

Naphthalide pseudo acid compounds useful in the preparation of indicator dyes are obtained by a new process wherein a naphthalic anhydride and phosphorus pentachloride are reacted to form a 1,8-naphthalyl dichloride which is complexed in situ with a Friedel-Crafts catalyst and then condensed in situ with a 1-naphthol having a free para position to yield the corresponding 3-hydroxy-3-(4'-hydroxy - 1 - naphthyl)naphthalide-1,8 pseudo acid.

---

The present invention relates to an improved method of preparing chemical compounds. More particularly, it relates to a new method of producing compounds which are useful in the preparation of dyes and especially indicator dyes such as those disclosed and claimed in copending U.S. Patent Applications Ser. No. 103,865 of Myron S. Simon and Ser. No. 103,864 of Myron S. Simon and David P. Waller, both filed Jan. 4, 1971.

Indicator dyes with spectral absorption characteristics that are reversibly alterable in response to changes in environmental pH find utility in such fields as titration analyses and photography. For example, when these dyes possess a colored form capable of absorbing visible radiation at one pH value and a substantially colorless or non-light absorbing form at a second pH value, they may be employed as optical filter agents in photographic processes.

One object of the present invention is to provide a novel process for obtaining chemical compounds useful in preparing dyes such as those mentioned above. Another object is to provide an improved process in which the isolation of an intermediate is no longer necessary, while a further object is to provide a process for producing such compounds in substantially increased yields. Other objects, features and advantages of this invention will be obvious or will appear hereinafter.

The invention accordingly comprises the several steps and the relation and order of one or more of such steps with respect to each of the others which are exemplified in the following detailed disclosure, and the scope of the application of which will be indicated in the claims.

The condensation of benzene with 1,8-naphthalyl dichloride prepared from 1,8-naphthalic anhydride is known in the art. According to the procedure described by F. A. Mason, Journal of the Chemical Society, Vol. CXXV, pp. 2116–2119 and 2119–2123 (1924), 1,8-naphthalic anhydride was reacted with phosphorus pentachloride in phosphorus oxychloride solvent to yield 1,8-naphthalyl dichloride [symmetrical 1,8-naphthalene dicarbonyl chloride, $C_{10}H_{16}(COCl)_2$, or unsymmetrical 3,3-dichloronaphthalide,

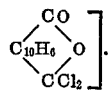

After isolation and purification, the 1,8-naphthalyl dichloride was condensed with benzene in equimolar proportions to yield 1-benzoyl-8-naphthoic acid by adding a chilled mixture of benzene, tetrachloroethane and powdered aluminum chloride to a solution of the naphthalyl dichloride in tetrachloroethane. In further studies by H. E. French and J. E. Kircher, Journal of the American Chemical Society, Vol. 66, pp. 298–300 (1944), it was concluded that Mason's naphthoic acid end product in solution is very largely, if not completely, in the form of the pseudo acid, 3-hydroxy-3-phenylnaphthalide-1,8; i.e., the cyclic compound having the structure:

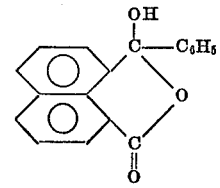

The overall yield of naphthoic acid end product obtained in the above procedure averaged not more than about 50% by weight as based on the naphthalic anhydride starting material. The yields reported by Mason ranged between 70 and 75% by weight of naphthalyl dichloride for the chlorination reaction and averaged 64% by weight of benzoyl-naphthoic acid for the condensation reaction to give an overall yield of only 45% to 48% by weight of naphthoic acid end product. Even lower yields of 50–60% by weight were obtained for the condensation reaction by French and Kircher, following the Mason procedure, Journal of the American Chemical Society, Vol. 63, pp. 3270–3272 (1941).

It has been found that the yields reported by Mason for the chlorination reaction cannot be readily reproduced. Repeated attempts on a laboratory scale gave an average of only 40% by weight of the naphthalyl dichloride. The condensation reaction of Mason was also repeated except that a 1-naphthol was condensed with the naphthalyl dichloride rather than benzene to produce compounds useful in synthesizing the aforementioned indicator dyes. Yields obtained in this reaction with 2-carbomethoxy-1-naphthol approximated those reported for the benzoylnaphthoic acid, but because of the low yield of naphthalyl dichloride obtained in the chlorination reaction, the overall yield of end product comprising 3-hydroxy-3-(3'-carboxethoxy - 4' - hydroxy-1'-naphthyl) naphthalide-1,8- was only about 20% to 25% by weight.

Such yields are too low for utilization of this procedure on a commercial scale. Moreover, the use of phosphorus oxychloride solvent in the chlorination reaction requires extended refluxing times of forty hours to sixty hours to obtain reasonable conversions and the 1,8-naphthalyl dichloride intermediate produced is highly corrosive and unstable. The dichloride decomposes immediately in water and converts back to the anhydride even in the presence of atmospheric moisture. Thus it is difficult to isolate without substantial loss of material, especially in the low yields obtained, and is also hard to store for use in the condensation reaction without decomposition back to the anhydride.

It has now been discovered, however, that the overall yield of 11-naphthol pseudo acids such as the 3-hydroxy-3 - (3' - carbomethoxy - 4' - hydroxy-1'-naphthyl)naphthalide-1,8 mentioned above can be more than doubled to attain commercially acceptable levels. This is accomplished by replacing the phosphorus oxychloride solvent used in the chlorination reaction with a solvent more effective in driving the reaction to completion and then conducting the condensation reaction in the same solution without isolating and purifying the naphthalyl dichloride intermediate. Because the 1,8-naphthalyl dichloride is obtained in substantially quantitative yields and in high purity in the chlorination reaction, the reaction solution contains primarily one material, i.e., the dichloride. The condensation may be conducted in the same solution, eliminating the previously required steps of isolating and purifying the naphthalyl dichloride intermediate. In addition to dramatically improving the overall yield of 1-naphthol pseudo acid end product, the subject method eliminates the steps of isolating and purifying the naphthalyl dichloride, thereby offering a more convenient and economical procedure for large-scale production as well as obviating the difficulties encountered in handling and preserving the highly corrosive and unstable naphthalyl dichloride intermediate.

In the process of the present invention naphthalic anhydride and phosphorous pentachloride are reacted together in certain solvents at elevated temperatures to produce a 1,8-naphthalyl dichloride. *In situ* condensation at reduced temperature of a 1-naphthol and the naphthalyl dichloride as an activated complex with a Friedel-Crafts type catalyst yields the pseudo acid end product. More particularly, a 1,8-naphthalic anhydride and phosphorus pentachloride are heated to a temperature between about 140° and 170° C. in a chlorinated hydrocarbon solvent which does not deactivate aluminum chloride. The 1,8-naphthalyl dichloride thereby produced is converted to an activated complex without isolation from solution by reacting it with aluminum chloride at a temperature not exceeding about 10° C. Again without isolation this complex is condensed *in situ* with the selected 1-naphthol at a temperature not exceeding about 30° C. to yield the pseudo acid condensation product.

In carrying out the method of the present invention, the 1,8-naphthalic anhydride and phosphorus pentachloride are reacted in a molar ratio of about 1.15 to 2.0 moles of phosphorus pentachloride per mole of naphthalic anhydride to yield the 1,8-naphthalyl dichloride. When the reaction solution is cooled to a temperature between about 0° and 10° C. aluminum chloride is added in portions to complexe the dichloride *in situ*. During this addition step and thereafter, the reaction solution is maintained at a temperature not exceeding about 10° C. to prevent the occurrence of undesirable side reactions that tend to take place at higher temperatures. The amount of aluminum chloride employed ranges between about 1.0 to 2.0 moles per mole of naphthalic anhydride and is preferably about 1.2 mole per mole of anhydride. Subsequent *in situ* condensation with a 1-naphthol to yield the pseudo acid end product is effected by adding the selected naphthol to the reaction solution in an amount substantially equivalent to that of the naphthalic anhydride, i.e., 1.0 mole of 1-naphthol per mole of anhydride. To ensure optimum yields, the naphthol is incorporated in the solvent selected for the chlorination reaction and/or in an appropriate diluent before being added.

The choice of solvent in the present method is of particular importance since it has been found that the conversion of naphthalic anhydride to the dichloride is dependent upon the nature of the solvent as well as on the reaction temperature. To achieve the high conversion rate essential in carrying out the subsequent condensation reaction *in situ*, the solvent selected should have a boiling point (or boiling range) that will permit conducting the chlorination reaction at a temperature between about 140° and 170° C. Furthermore, the solvent should promote high conversion without any substantial decomposition of the naphthalyl dichloride product at this temperature range. The solvent should not deactivate aluminum chloride so as not to interfere with the subsequent complexing and condensation reactions which are conducted in the same solvent solution.

While any solvent possessing these properties may be employed, certain chlorinated hydrocarbon solvents have been found particularly useful, namely, 1,2-dichlorobenzene (boiling point 180.5° C.); 1,4-dichlorobenzene (boiling point 174° C.); 1,2,4-trichlorobenzene (boiling point 213.5° C.); and 1,1,2,2-tetrachloroethane (boiling point 146.2° C.). As reflected by the good yield of pseudo acid end products such as the aforementioned 3-hydroxy-3 - (3' - carbomethoxy - 4'-hydroxy-1'-naphthyl)naphthalide-1,8, high conversions of naphthalic anhydride to naphthalyl dichloride are achieved in reasonable chlorination times of about 6 to 12 hours using these solvents. In comparison, when solvents with lower boiling points are utilized, e.g., nitroethane (boiling point 115° C.) and phosphoryl chloride (boiling point 108° C.), the reaction between naphthalic anhydride and phosphorus pentachloride was found to be incomplete even after as much as one week at reflux temperature.

The conversion achieved in a given solvent is dependent not only on the temperature which can be reached in that solvent, but also on very specific properties of that solvent. Thus in a high boiling solvent such as diphenyl ether (boiling point 259° C.) little conversion occurred at the desired temperature range of 140–170° C., and further increasing the tempreature only caused extensive decomposition. Incomplete reaction with the aforementioned lower boiling solvents and substantial decomposition with these higher boiling but less reactive solvents resulted in both instances in poor conversions and consequently, in poor overall yields of end product.

As noted above, the 1-naphthol is preferably incorporated in the solvent selected for the prior chlorination reaction and/or a diluent when it is added to the reaction solution containing the naphthalyl dichloride complex. Any diluent employed should be miscible with the chlorination reaction solvent and should be inert to the reactants under the conditions of the condensation reaction. Suitable diluent include methylene chloride, chloroform and 1,2-dichloroethane. It is preferred, however, to use the chlorination solvent for introducing the aromatic compound.

In the present method the sequence of steps, i.e., the order of addition, is important, the aluminum chloride being added to the solution of naphthalyl dichloride to form a complex therewith prior to the addition of the 1-naphthol. The present method is preferably conducted under substantially anhydrous conditions because of the moisture sensitivity of the naphthalyl dichloride intermediate as discussed above and of the phosphorus pentachloride and aluminum chloride reagents which react rapidly with water vapor present in the air to form the respective oxychlorides.

The pseudo acid obtained upon condensation of the 1-naphthol with the naphthalyl dichloride-aluminum chloride complex may be isolated by quenching the reaction mixture in water, adding methylene chloride to the resulting emulsion and heating at reflux until two clear layers are formed. The aqueous phase is discarded and the organic phase is washed with dilute sodium bicarbonate. The pseudo acid, which crystallizes in high yield, is then placed under vacuum at 120° C. to remove any volatile component that may be present.

In a preferred isolation procedure, tetrachloroethane is added to the resulting emulsion after quenching the reaction mixture in water. The mixture is heated at 95°–100° C. until two clear, solids-free layers are obtained. The strongly acidic aqueous phase containing inorganic salts is discarded while the organic portion is washed with dilute sodium bicarbonate solution to neutralize any residual acid and remove any remaining water soluble matter which can cause emulsification during the next step. In order to prevent precipitation of solids at this point and to ensure the cleanest possible separation of the two layers, the solution is kept hot (60°–65° C.). After discarding the bicarbonate phase, the tetrachloroethane layer is cooled to 20°–25° C. and a carefully controlled amount of aqueous sodium hydroxide and sodium carbonate is added while maintaining the temperature at or below about 25° C. to prevent hydrolysis of the ester. The pseudo acid and product is then precipitated by addition of the alkaline solution into aqueous acetic acid.

Though any 1-naphthol may be employed in the condensation with the complexed naphthalyl dichloride, the 1-naphthol utilized in a preferred embodiment of this invention is unsubstituted or substituted ortho to the functional hydroxy group with a carboxy or lower carboalkoxy. When such a compound is employed, the three step synthesis of the present invention may be illustrated as follows:

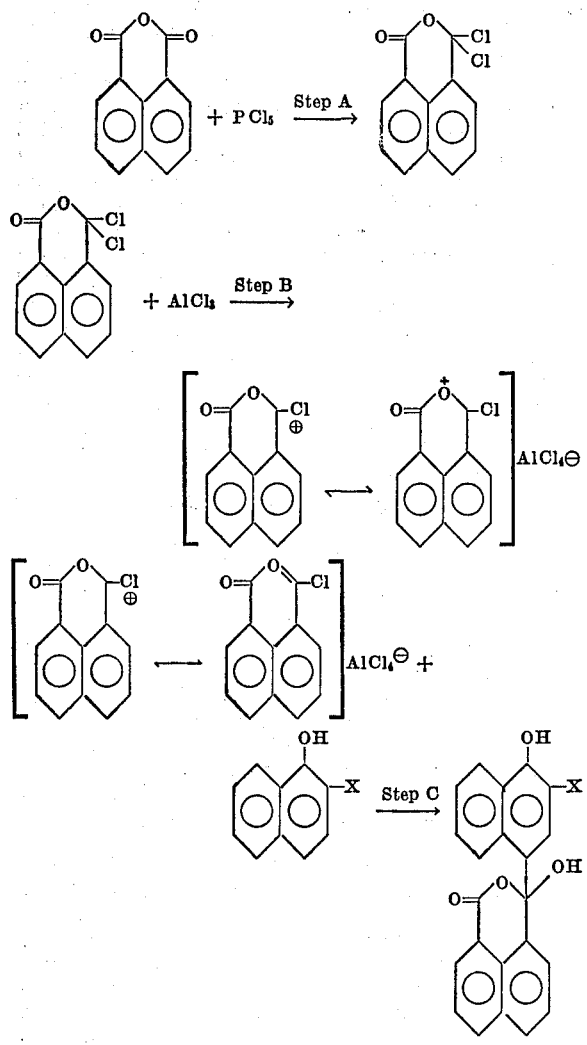

wherein X is selected from hydrogen and —COOR and R is hydrogen or lower alkyl having 1 to 4 carbon atoms such as methyl, ethyl, s-propyl and t-butyl.

The following examples are given to further illustrate the invention and are not intended to limit its scope.

EXAMPLE I 0.10 mole of naphthalic anhydride (19.8 g.) and 0.15 mole of phosphorus pentachloride (31.5 g.) were refluxed at 146° C. for 6 hours in 1,1,2,2-tetrachloroethane (100 ml.). The resultant light amber colored solution containing 1,8-naphthalyl dichloride was cooled to room temperature and then chilled in an ice bath to 10° C. 0.105 mole of aluminum chloride (14 g.) was added to this solution in portions with rapid agitation, precipitating a bright yellow crystalline complex which was converted to a dark purple solution by the dropwise addition over a 1 hour period of 0.10 mole of 2-carbomethoxy-1-naphthol (20.5 g.) in tetrachloroethane (50 ml.). The solution was stirred at room temperature (approximately 22° C.) for 3.5 hours and poured into rapidly stirred ice cold water (500 ml.) After being stirred for another 15 minutes, it was poured into methylene chloride (1 l.) and heated on a steam bath for several minutes so that only a trace of solids remained in situ. Then the aqueous layer was discarded and the remainder placed in a freezer for 24 hours, filtered, washed with cold methylene chloride and oven dried in vacuo at 60° C. to provide a 75% by weight yield of 3 - hydroxy - 3 - (3'-carbomethoxy-4'-hydroxy - 1' - naphthyl)naphthalide-1,8 (30 g.) melting at 232° C. and of 98% purity. The mother liquor was shaken with 0.50 molar sodium carbonate (500 ml.), extracted, added dropwise to ice cold 10% w./w. hydrochloric acid, filtered and oven dried in vacuo at 60° C. over phosphorus pentoxide to give an additional 9% of the pseudo acid (3.4 g.), having the same purity for an overall yield of 84% by weight.

EXAMPLE II 0.10 mole of naphthalic anhydride (19.8 g.) and 0.20 mole of phosphorus pentachloride (42.0 g.) were heated at 165–170° C. for 6 hours in 1,4-dichlorobenzene (123 g.). The resultant light amber colored solution containing 1,8-naphthalyl dichloride was first cooled to 50° C. when methylene chloride (100 ml.) was added and then to 0–10° C. when 0.10 mole of aluminum chloride (14 g.) was added in portions with vigorous stirring. Dropwise addition over a 1 hour period of 0.10 mole of 2-carbomethoxy-1-naphthol (20.5 g.) in methylene chloride (100 ml.) yielded a dark purple solution which was stirred at room temperature for 3.5 hours and then poured into rapidly stirred ice cold water (1 l.) After being stirred for another 30 minutes, methylene chloride (800 ml.) was added and the mixture heated for several minutes on a steam bath. Then the aqueous phase was discarded and the cloudy yellow organic layer placed in a freezer for 3 days, filtered, washed with cold methylene chloride and oven dried in vacuo at 60° C. to provide a 56% by weight yield of 3-hydroxy-3-(3'-carbomethoxy-4'-hydroxy-1'-naphthyl) naphthalide-1,8 (22.5 g.) melting in the range of 229–230° C. and of 92–95% purity. The filtrate was shaken with 0.25 molar sodium carbonate (1 l.), extracted, added dropwise to ice cold 10% w./w. hydrochloric acid, filtered, washed with water and oven dried in vacuo at 70° C. over phosphorus pentoxide to give an additional 31% of the pseudo acid (12.3 g.) melting in the range of 227–228° C. and having the same purity for an overall yield of 86% by weight.

EXAMPLE III 0.10 mole of naphthalic anhydride (19.8 g.) and 0.15 mole of phosphorus pentachloride (31.5 g.) were refluxed at 150° C. for 8 hours in 1,1,2,2-tetrachloroethane (75 ml.) under a nitrogen atmosphere. The resultant light amber colored solution containing 1,8-naphthalyl dichloride was cooled to 10° C. when 0.20 mole of aluminum chloride (27 g.) was added with rapid stirring to produce a bright yellow crystalline complex. A solution of 0.10 mole of 2-carbomethoxy-1-naphthol in tetrachloroethane (25 ml.) was then added over a 1 hour period. The cooling bath was removed and the solution stirred for 3.5 hours before being poured into ice cold water (800 ml.) where it was stirred for 1 hour. Methylene chloride (1 l.) was then added and the mixture warmed to 40° C. with slow agitation when 2 clear solid-free layers formed within 15 minutes. The bottom organic layer was removed and washed with 0.06 molar sodium bicarbonate (800 ml.). The washed organic fraction was then removed and added to aqueous 0.50 molar sodium carbonate (800 ml.) and the 2 phases shaken vigorously for 30 minutes. The organic phase was discarded and the aqueous phase washed twice with methylene chloride (50 ml. each time) and filtered. A 10% emulsion of Dow Corning Antifoam B (1 ml.) was added to the clear yellow solution, followed by the addition of glacial acetic acid (50 ml.) with rapid stirring over a 30 minute period. The resultant precipitate was washed twice in water (100 ml. each time) and oven dried in vacuo at 85° C. to give 30 g. of 93.6–95.4% pure 3 - hydroxy-3-(3'-carbomethoxy-4'-hydroxy-1'-naphthyl) naphthalide-1,8 for an actual yield of 74% by weight (29.6 g.).

EXAMPLE IV 0.10 mole of naphthalic anhydride (19.8 g.) and 0.15 mole of phosphorus pentachloride (31.5 g.) were refluxed at 146° C. for 8 hours in 1,1,2,2-tetrachloroethane (75 ml.) under a nitrogen atmosphere. The resultant light amber colored solution containing 1,8-naphthalyl dichloride was cooled to 10° C. when 0.115 mole of "Baker Analyzed" aluminum chloride was added with rapid stirring over a 1 minute period to produce a bright yellow crystalline complex. A solution of 0.10 mole of 2-carbomethoxy-1-naphthol in tetrachloroethane (25 ml.) was then added over a 30 minute period. The cooling bath was removed and the solution stirred for 3 hours as the temperature rose to 22° C. when the dark purple solution was poured into rapidly stirred, ice cold water (500 ml.). After a few minutes the resulting exotherm had increased the temperature to about 30° C. The solution was then stirred for 15 minutes, tetrachloroethane (500 ml.) was added and the resultant light beige emulusion heated to 90°–100° C. when 2 clear solids-free layers formed within 20 minutes. The bottom organic layer was removed and washed with 0.25 molar sodium bicarbonate (400 ml.). The washed organic fraction was then cooled to room temperature and added to an aqueous 0.50 molar sodium carbonate solution containing 0.175 mole of 50% w./w. sodium hydroxide (14 g.) and the 2 phases stirred vigorously for 30 minutes. The organic phase was discarded and the aqueous phase washed twice with methylene chloride (25 ml. each time), filtered and added to a solution of acetic acid (55 ml.) in water (45 ml.). Filtration, washing with water and oven drying in vacuo at 80° C. gave an 80% by weight yield of 96.5% pure 3-hydroxy-3-(3'-carbomethoxy - 4' - hydroxy-1'-naphthyl) naphthalide-1,8 (32 g.) containing 0.10% volatiles for an actual yield of 77.5% by weight.

EXAMPLE V 0.10 mole of naphthalic anhydride (19.8 g.) and 0.15 mole of phosphorus pentachloride (31.5 g.) were heated at 170° C. for 5 hours in 1,2,4-trichlorobenzene (75 ml.). The resultant solution containing 1,8-naphthalyl dichloride was cooled to 10° C. when 0.105 mole of aluminum chloride (14 g.) was added in portions. After dropwise addition over a 45 minute period of 0.10 mole of 2-carbomethoxy-1-naphthol (20.2 g.) in 1,2,4-trichlorobenzene (25 ml.), the cooling bath was removed and the resultant purple solution stirred for 3.5 hours before being poured into rapidly stirred cold water (500 ml.) After 30 minutes methylene chloride (1 l.) was added to the emulsion and the resultant mixture refluxed in a steam bath. When no further dissolution of remaining solids was evident, the organic layer was separated from the aqueous phase, allowed to cool to room temperature and stored at −20° C. for 18 hours. The crystallized product was filtered, washed with benzene and oven dried in vacuo at 60° C. to provide a 52% by weight yield of 3-hydroxy-3-(3'-carbomethoxy-4'-hydroxy-1-naphthyl)naphthalide-1,8 (21 g.). The solids suspended in the aqueous phase were filtered and added to the organic layer's trichlorobenzene filtrate. This solution was extracted with 0.25 molar sodium carbonate, acidified with 1% aqueous hydrochloric acid and dried to give an additional 18% of the pseudo acid (7 g.) for an overall yield of 70% by weight.

EXAMPLE VI

The procedure of Example V was followed except that the naphthalic anhydride and phosphorus pentachloride were heated at 165° C. for 4.5 hours in 1,2-dichlorobenzene. A 70% by weight yield of pseudo acid was obtained.

EXAMPLE VII

The procedure of Example VI was followed except that the naphthalic anhydride and phosphorus pentachloride were heated at 155° C. for 7 hours. A 70% by weight yield of the pseudo acid was obtained.

EXAMPLE VIII 0.10 mole of naphthalic anhydride (19.8 g.) and 0.15 mole of phosphorus pentachloride (31.5 g.) were refluxed at 146° C. for 8 hours in 1,1,2,2-tetrachloroethane (75 ml.). The resultant solution containing 1,8-naphthalyl dichloride was cooled to 10° C. when 0.105 mole of fresh aluminum chloride (14 g.) was added in portions. After a slurry containing 0.10 mole of 2-carboxy-1-naphthol (19.8 g.) in 1,1,2,2-tetrachloroethane (25 ml.) was added in small portions over a 1 hour period, the cooling bath was removed and the purple mixture stirred for 3.5 hours before being poured into rapidly stirred cold water (400 ml.). 1,1,2,2-tetrachloroethane (500 ml.) was added and the mixture heated to 95° C. Then the organic layer and the interface layer between it and the aqueous phase were separated out and shaken with a solution of sodium carbonate (20 g.) and 50% w./w. hydrochloric acid (14 g.) in water (400 ml.). The resultant caustic solution was slowly added to acetic acid (50 ml.) in water (200 ml.), filtered and oven dried in vacuo at 60° C. to give 22 g. of 95% pure 3-hydroxy-3-(3'-carboxy - 4' - hydroxy-1-naphthyl)naphthalide-1,8 containing 2 - carboxy - 1 - naphthol alone as the 5% impurity for an actual yield of 54% by weight.

EXAMPLE IX

The procedure of Example VIII was followed using 0.10 mole one 1-naphthol (14.4 g.) instead of the 2-carboxy-1-naphthol. A 56% by weight yield of 3-hydroxy-3-(4'-hydroxy-1-naphthyl)naphthalide was obtained.

In contrast to the experiments with 1-naphthols described above, reactions with phenol and salicyclic acid carried out following the procedure in the above examples failed to yield the desired products.

The 2-carbomethoxy-1-naphthol utilized in Examples I through VII was prepared by the following method:

0.266 mole of dry 2-carboxy-1-naphthol (50 g.) was suspended in dry benzene (350 ml.) in a flame-dried liter 1-neck round bottom flask under an air condenser and drying tube. 0.266 mole of thionyl chloride (31.7 g.) was added in one portion followed by the addition of dry N,N-dimethylformamide (1.5 ml.). The reaction mixture was stirred magnetically at room temperature for 2–3 days. Insoluble material 6.5 g.) was removed by filtration and the yellow-tan filtrate was evaporated to dryness to give pale yellow 1-hydroxy-2-naphthoyl chloride melting in the range of 87–88° C. Chilled anhydrous methanol (100 ml.) was added quickly to solid chloride in an exothermic reaction. The partial solution was heated about 5 minutes on a steam bath under a drying tube and then allowed to cool. The suspension was chilled and the solid was collected to give 92% by weight of 2-carbomethoxy-1-naphthol (43 g.).

Since substitutions and changes may be made in the above processes without departing from the scope of the disclosed invention, it is intended that all matter contained in the foregoing description shall be interpreted as illustrative and not in a limiting sense.

What is claimed is:

1. A process for preparing a naphthalide pseudo acid which comprises the steps of:
   (A) reacting a naphthalic anhydride with phosphorus pentachloride at elevated temperature in a chlorinated hydrocarbon solvent which does not deactivate a Friedel-Crafts catalyst to form the corresponding 1,8-naphthlyl dichloride;
   (B) reacting said naphthalyl dichloride in situ with a Friedel-Crafts catalyst at reduced temperature to form an activated complex; and
   (C) reacting said activated complex in situ with a 2-X-1-naphthol having a free para position, wherein X is hydrogen or COOR and R is hydrogen or alkyl, to yield the corresponding 3-hydroxy-3-(3'-X-4'-hydroxy-1-naphthyl)naphthalide-1,8-pseudo acid.

2. The process of claim 1 wherein step (A) is conducted at an elevated temperature between about 140° and 170° C., step (B) is conducted at a reduced temperature not exceeding about 10° C., step (C) is conducted at a temperature not exceeding about 30° C. and said Friedel-Crafts catalyst is aluminum chloride.

3. The process of claim 2 wherein said chlorinated hydrocarbon solvent is chosen from 1,1,2,2-tetrachloroethane, 1,2-dichlorobenzene, 1,4-dichlorobenzene and 1,2,4-trichlorobenzene and said process is conducted under substantially anhydrous conditions.

4. The process of claim 3 wherein X is COOR and R is lower alkyl having 1 to 4 carbon atoms.

5. The process of claim 4 wherein R is methyl.

6. The process of claim 3 wherein said chlorinated hydrocarbon solvent is 1,1,2,2-tetrachloroethane.

7. The process of claim 6 wherein X is hydrogen.

8. The process of claim 6 wherein X is COOR and R is hydrogen.

References Cited

J. Org. Chem., vol. 25, 1960, pp. 1872–74.

HENRY R. JILES, Primary Examiner

M. A. M. CROWDER, Assistant Examiner